US009122793B2

(12) United States Patent
Bragstad et al.

(10) Patent No.: US 9,122,793 B2
(45) Date of Patent: *Sep. 1, 2015

(54) DISTRIBUTED DEBUGGING OF AN APPLICATION IN A DISTRIBUTED COMPUTING ENVIRONMENT

(71) Applicant: International Business Machines Corporation, Armonk, NY (US)

(72) Inventors: Lance Bragstad, Pine Island, MN (US); Bin Cao, Rochester, MN (US); James E. Carey, Rochester, MN (US); Mathew R. Odden, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/291,504

(22) Filed: May 30, 2014

(65) Prior Publication Data

US 2015/0161023 A1    Jun. 11, 2015

Related U.S. Application Data

(63) Continuation of application No. 14/100,977, filed on Dec. 9, 2013.

(51) Int. Cl.
*G06F 9/44* (2006.01)
*G06F 11/36* (2006.01)

(52) U.S. Cl.
CPC .................... *G06F 11/362* (2013.01)

(58) Field of Classification Search
CPC ........................................... G06F 11/362

USPC .................................................. 717/124–135
See application file for complete search history.

(56) References Cited

U.S. PATENT DOCUMENTS

| | | | |
|---|---|---|---|
| 6,249,881 B1* | 6/2001 | Porten et al. | 714/38.13 |
| 6,353,923 B1* | 3/2002 | Bogle et al. | 717/128 |
| 2001/0005852 A1* | 6/2001 | Bogle et al. | 709/102 |
| 2007/0168968 A1* | 7/2007 | Bates et al. | 717/124 |
| 2011/0161730 A1* | 6/2011 | Van Der Merwe et al. | 714/15 |

(Continued)

OTHER PUBLICATIONS

Kroustek, J.; Prikryl, Z.; Kolar, D.; Hruska, T., "Retargetable multi-level debugging in HW/SW codesign," Microelectronics (ICM), 2011 International Conference on, pp. 1-6, Dec. 19-22, 2011.*

(Continued)

*Primary Examiner* — Satish Rampuria
(74) *Attorney, Agent, or Firm* — Edward J. Lenart; Kennedy Lenart Spraggins LLP (57) ABSTRACT

Methods, apparatuses, and computer program product for distributed debugging of an application in a distributed computing environment are provided. Embodiments include a first debug module on a first host receiving a set breakpoint message from a management debug module of a management system. In response to receiving the set breakpoint message, the first debug module sets a breakpoint for executing a first service on the first host, for the application. Upon hitting the breakpoint while executing the first service for the application, the first debug module sends a breakpoint condition of the first service to the management debug module. In response to receiving the breakpoint condition, the management debug module sends to a second debug module of a second host, an instruction to pause execution of the second service of the second host.

5 Claims, 6 Drawing Sheets

(56) References Cited

U.S. PATENT DOCUMENTS

2011/0173327 A1    7/2011    Chen et al.
2012/0272235 A1    10/2012   Fahrig
2012/0330700 A1    12/2012   Garg et al.

OTHER PUBLICATIONS

Vasudevan, A.; Yerraballi, R., "Stealth breakpoints," Computer Security Applications Conference, 21st Annual, pp. 10, Dec. 2005.*
Olsson, R.A.; Crawford, R.H.; Ho, W.W.; Wee, C.E., "Sequential debugging at a high level of abstraction," Software, IEEE, vol. 8, No. 3, pp. 27-36, May 1991.*
Fagerstrom, J.; Stromberg, L., "A paradigm and system for design and test of distributed applications," Compcon Spring '88. Thirty-Third IEEE Computer Society International Conference, Digest of Papers, pp. 189-192, Feb. 29, 1998-Mar. 3, 1988.*
Rai, S.; Sampath, D.; Srivathsa, N.S., "Implementation of DDARC: software architecture for debugging distributed programs," Computer Systems and Applications, ACS/IEEE International Conference on. 2001, pp. 220-226, 2001.*
Kurniawan, D.; Abramson, D., "An Integrated Grid Development Environment in Eclipse," e-Science and Grid Computing, IEEE International Conference on, pp. 491-498, Dec. 10-13, 2007.*
Fagerstrom, J., "Design and test of distributed applications," Software Engineering, 1988., Proceedings of the 10th International Conference on, pp. 88-92, Apr. 11-15, 1988.*
Lee, et al., "Validating Heuristics for Virtual Machines Consolidation", Type: TechReport, No. MSR-TR-2011-9, Jan. 1, 2011, pp. 1-14, Microsoft Research, Mountain View, CA, USA.
Gong, et al., "PAC: Pattern-driven Application Consolidation for Efficient Cloud Computing", In Proceedings, IEEE/ACM International Symposium on Modeling, Analysis and Simulation of Computer and Telecommunication Systems (MASCOTS), held Aug. 2010, Miami, FL, pp. 24-33, Institute of Electrical and Electronics Engineers (IEEE), Digital Object Identifier: 10.1109/MASCOTS. 2010.12.
Spiceworks, "Spiceworks Launches Free Cloud Service Detection Features for Small and Mid-sized Businesses", press release, spiceworks.com (online), May 24, 2012 [accessed Jul. 18, 2013], 2 pages, URL: http://www.spiceworks.com/news/press-release/2012/05-24/.
Di Modica, et al., "Resource and Service Discovery in SOAs: A P2P Oriented Semantic Approach", International Journal of Applied Mathematics & Computer Science, Jun. 2011, pp. 285-294, vol. 21, Issue 2, University of Zielona Gora Press, Poland, DOI: 10.2478/v10006-011-0021-2.
Zhou, et al., "A Hybird P2P Approach to Service Discovery in the Cloud", International Journal of Information Technology and Computer Science (IJITCS), Feb. 2011, pp. 1-9, vol. 3, No. 1, Modern Education and Computer Science Press (online publication), Hong Kong, mecs-press.org, URL: http://www.mecs-press.org/ijitcs/ijitcs-v3-n1/IJITCS-V3-N1-1.pdf.

* cited by examiner

DISTRIBUTED DEBUGGING OF AN APPLICATION IN A DISTRIBUTED COMPUTING ENVIRONMENT

CROSS-REFERENCE TO RELATED APPLICATION

This application is a continuation application of and claims priority from U.S. patent application Ser. No. 14/100,977, filed on Dec. 9, 2013.

BACKGROUND OF THE INVENTION

1. Field of the Invention

The field of the invention is data processing, or, more specifically, methods, apparatuses, and computer program products distributed debugging of an application in a distributed computing environment.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Software source code is increasingly complex and is often developed by various developers, sometimes physically dispersed from one another. One part of software development, source code debugging, is especially complex in today's distributed software development environments.

SUMMARY

Methods, apparatuses, and computer program product for distributed debugging of an application in a distributed computing environment are provided. Embodiments include a first debug module on a first host receiving a set breakpoint message from a management debug module of a management system. In response to receiving the set breakpoint message, the first debug module sets a breakpoint for executing a first service on the first host, for the application. Upon hitting the breakpoint while executing the first service for the application, the first debug module sends a breakpoint condition of the first service to the management debug module. In response to receiving the breakpoint condition, the management debug module sends to a second debug module of a second host, an instruction to pause execution of the second service of the second host.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Example methods, apparatuses, and computer program products for distributed debugging of an application in a distributed computing environment in accordance with the present invention are described with reference to the accompanying drawings, beginning with FIG. 1. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service ('SaaS'): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service ('Paas'): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service ('IaaS'): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
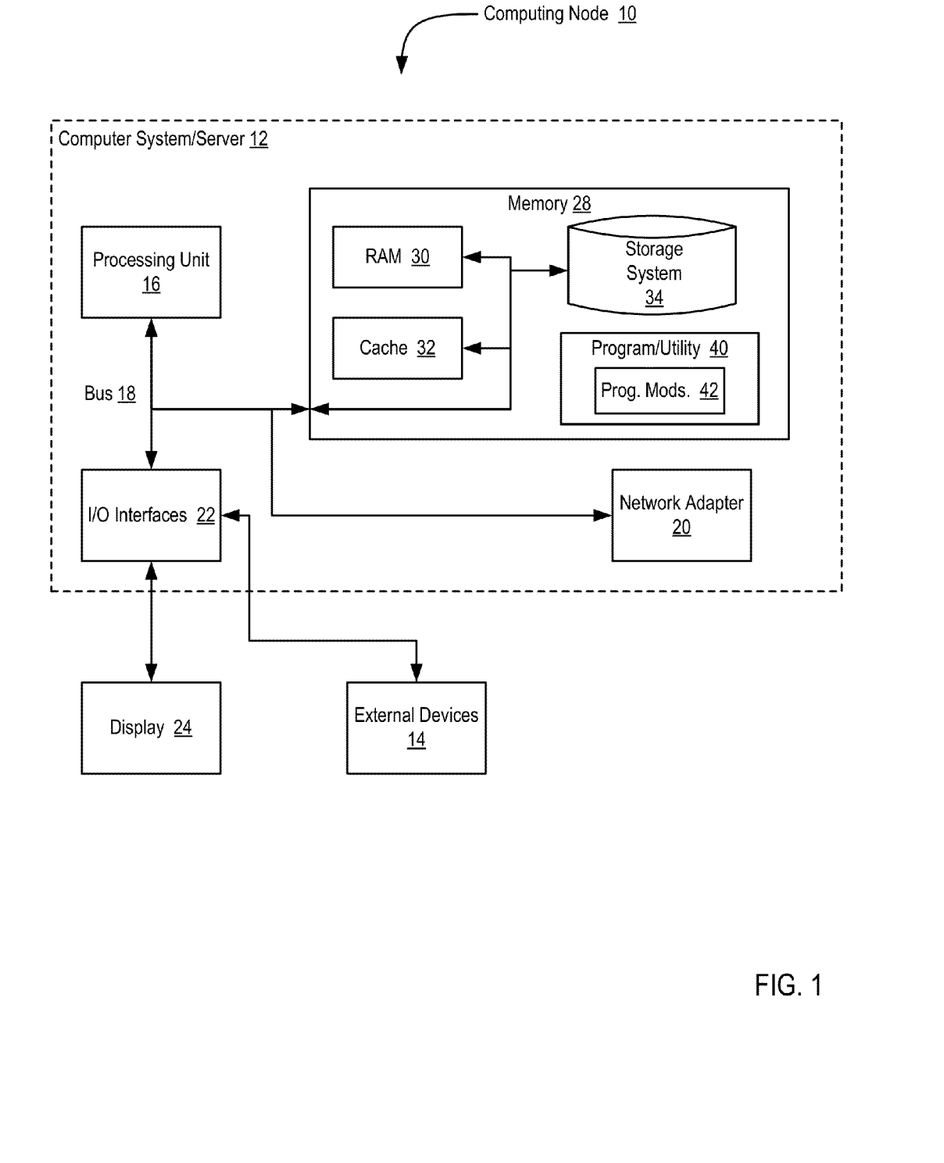
FIG. 1 depicts a cloud computing node according to an embodiment of the present invention.

Referring now to FIG. 1, a schematic of an example of a cloud computing node is shown. Cloud computing node (10) is only one example of a suitable cloud computing node and is not intended to suggest any limitation as to the scope of use or functionality of embodiments of the invention described herein. Regardless, cloud computing node (10) is capable of being implemented and/or performing any of the functionality set forth hereinabove.

In cloud computing node (10) there is a computer system/server (12), which is operational with numerous other general purpose or special purpose computing system environments or configurations. Examples of well-known computing systems, environments, and/or configurations that may be suitable for use with computer system/server (12) include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server (12) may be described in the general context of computer system executable instructions, such as program modules, being executed by a computer system. Generally, program modules may include routines, programs, objects, components, logic, data structures, and so on that perform particular tasks or implement particular abstract data types. Computer system/server (12) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server (12) in cloud computing node (10) is shown in the form of a general-purpose computing device. The components of computer system/server (12) may include, but are not limited to, one or more processors or processing units (16), a system memory (28), and a bus (18) that couples various system components including system memory (28) to processor (16).

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture ('ISA') bus, Micro Channel Architecture ('MCA') bus, Enhanced ISA ('EISA') bus, Video Electronics Standards Association ('VESA') local bus, and Peripheral Component Interconnect ('PCI') bus.

Computer system/server (12) typically includes a variety of computer system readable media. Such media may be any available media that is accessible by computer system/server (12), and it includes both volatile and non-volatile media, removable and non-removable media.

System memory (28) can include computer system readable media in the form of volatile memory, such as random access memory ('RAM') (30) and/or cache memory (32). Computer system/server (12) may further include other removable/non-removable, volatile/non-volatile computer system storage media. By way of example only, storage system (34) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (18) by one or more data media interfaces. As will be further depicted and described below, memory (28) may include at least one program product having a set (e.g., at least one) of program modules that are configured to carry out the functions of embodiments of the invention.

Program/utility (40), having a set (at least one) of program modules (42), may be stored in memory (28) by way of example, and not limitation, as well as an operating system, one or more application programs, other program modules, and program data. Each of the operating system, one or more application programs, other program modules, and program data or some combination thereof, may include an implementation of a networking environment. Program modules (42) generally carry out the functions and/or methodologies of embodiments of the invention as described herein.

Computer system/server (12) may also communicate with one or more external devices (14) such as a keyboard, a pointing device, a display (24), etc.; one or more devices that enable a user to interact with computer system/server (12); and/or any devices (e.g., network card, modem, etc.) that enable computer system/server (12) to communicate with one or more other computing devices. Such communication can occur via Input/Output ('I/O') interfaces (22). Still yet, computer system/server (12) can communicate with one or more networks such as a local area network (IAN), a general wide area network ('WAN'), and/or a public network (e.g., the Internet) via network adapter (20). As depicted, network adapter (20) communicates with the other components of computer system/server (12) via bus (18). It should be understood that although not shown, other hardware and/or software components could be used in conjunction with computer system/server (12). Examples, include, but are not limited to: microcode, device drivers, redundant processing units, external disk drive arrays, RAID systems, tape drives, and data archival storage systems, etc.

Figure 2:
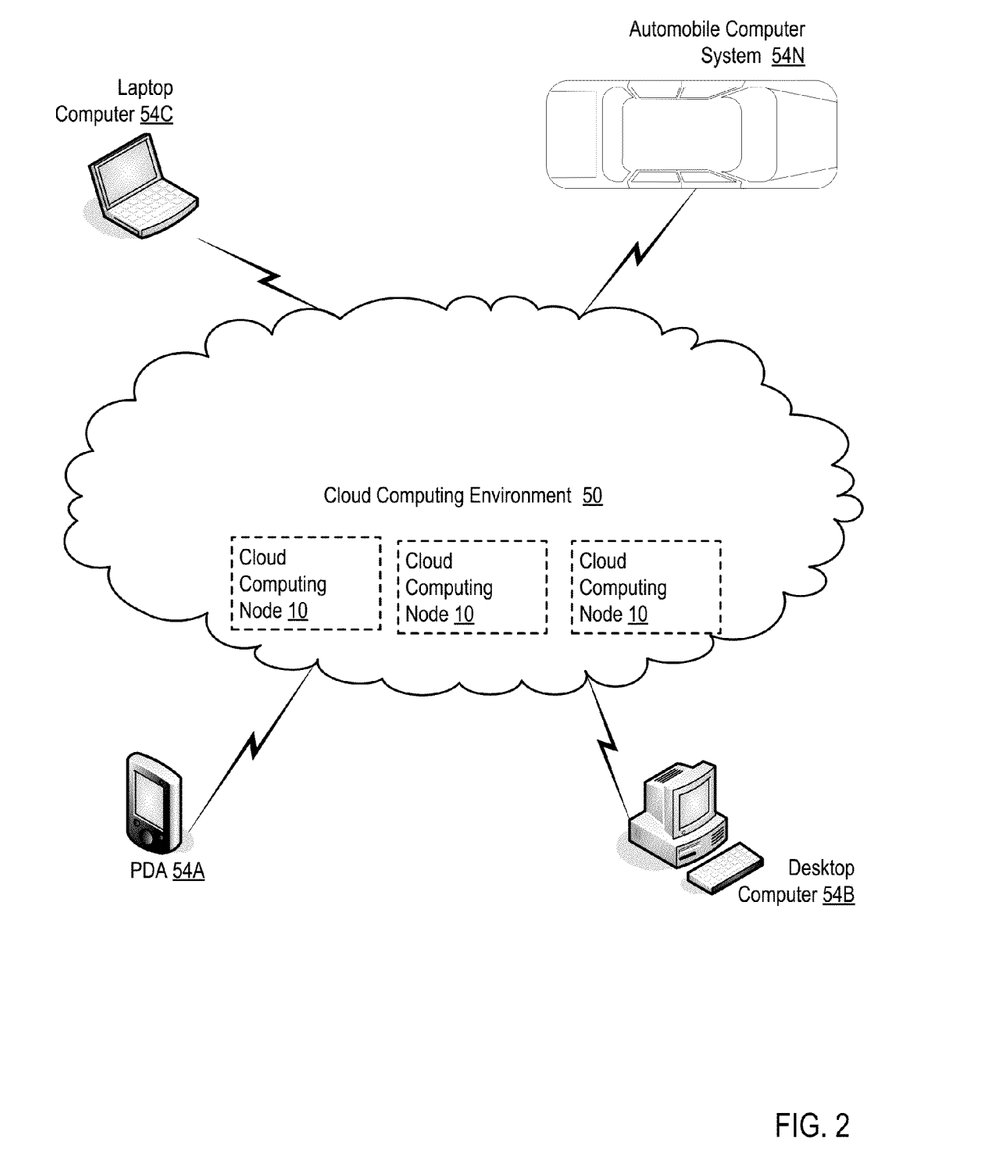
FIG. 2 depicts a cloud computing environment according to an embodiment of the present invention.

Referring now to FIG. 2, illustrative cloud computing environment (50) is depicted. As shown, cloud computing environment (50) comprises one or more cloud computing nodes (10) with which local computing devices used by cloud consumers, such as, for example, personal digital assistant ('PDA') or cellular telephone (54A), desktop computer (54B), laptop computer (54C), and/or automobile computer system (54N) may communicate. The cloud computing nodes (10) may communicate with one another. They may be grouped (not shown) physically or virtually, in one or more networks, such as Private, Community, Public, or Hybrid clouds as described hereinabove, or a combination thereof. This allows cloud computing environment (50) to offer infrastructure, platforms and/or software as services for which a cloud consumer does not need to maintain resources on a local computing device. It is understood that the types of computing devices (54A-N) shown in FIG. 2 are intended to be illustrative only and that computing nodes (10) and cloud computing environment (50) can communicate with any type of computerized device over any type of network and/or network addressable connection (e.g., using a web browser).

Figure 3:
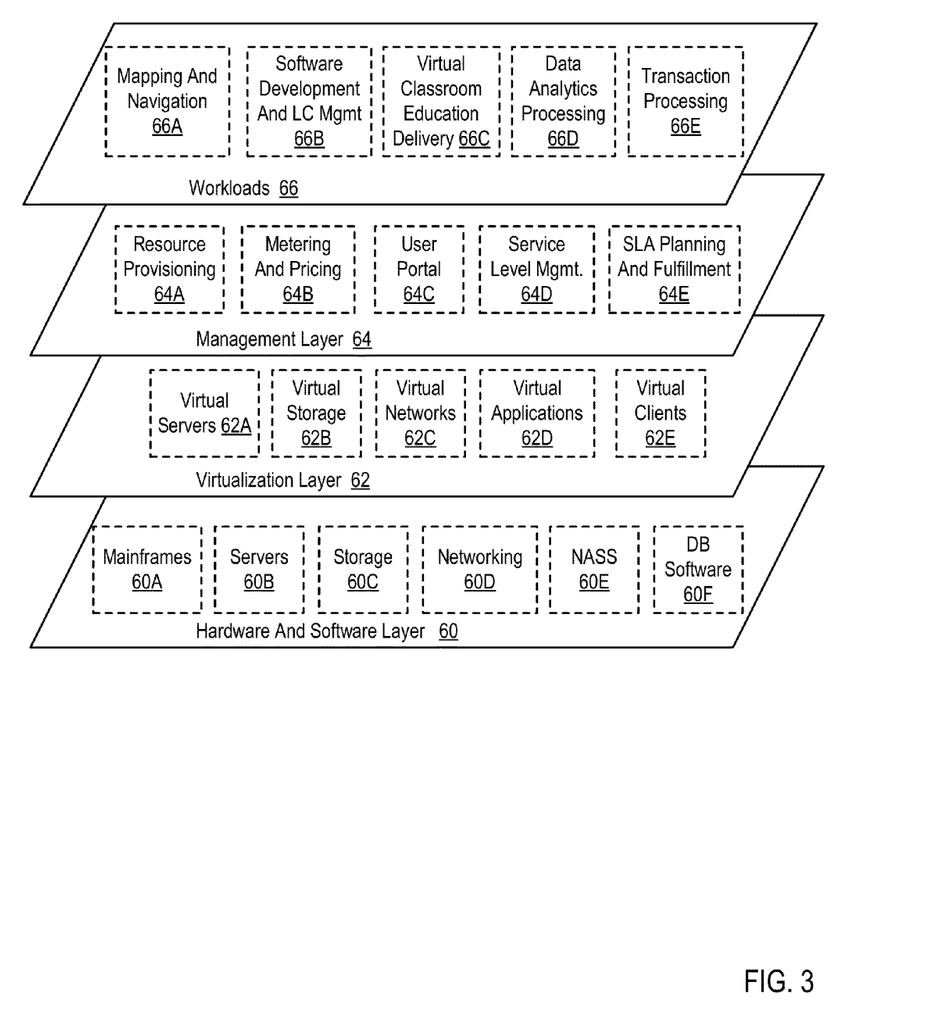
FIG. 3 depicts abstraction model layers according to an embodiment of the present invention.

Referring now to FIG. 3, a set of functional abstraction layers provided by cloud computing environment (element 50 in FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer (60) includes hardware and software components.

Examples of hardware components include mainframes (60A), in one example IBM® zSeries® systems; RISC (Reduced Instruction Set Computer) architecture based servers (60B), in one example IBM pSeries® systems; IBM xSeries® systems; IBM BladeCenter® systems; storage devices (60C); networks and networking components (60D). Examples of software components include network application server software (60E), in one example IBM WebSphere® application server software; and database software (60F), in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (62) provides an abstraction layer from which the following examples of virtual entities may be provided: virtual servers (62A); virtual storage (62B); virtual networks (62C), including virtual private networks; virtual applications (62D) and operating systems; and virtual clients (62E).

In one example, management layer (64) may provide the functions described below. Resource provisioning (64A) provides dynamic procurement of computing resources and other resources that are utilized to perform tasks within the cloud computing environment. Metering and Pricing (64B) provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal (64C) provides access to the cloud computing environment for consumers and system administrators. Service level management (64D) provides cloud computing resource allocation and management such that required service levels are met. Service Level Agreement (SLA) planning and fulfillment (64E) provides pre-arrangement for, and procurement of, cloud computing resources for which a future requirement is anticipated in accordance with an SLA.

Workloads layer (66) provides examples of functionality for which the cloud computing environment may be utilized. Examples of workloads and functions which may be provided from this layer include: mapping and navigation (66A); software development and lifecycle management (66B); virtual classroom education delivery (66C); data analytics processing (66D); and transaction processing (66E).

Figure 4:
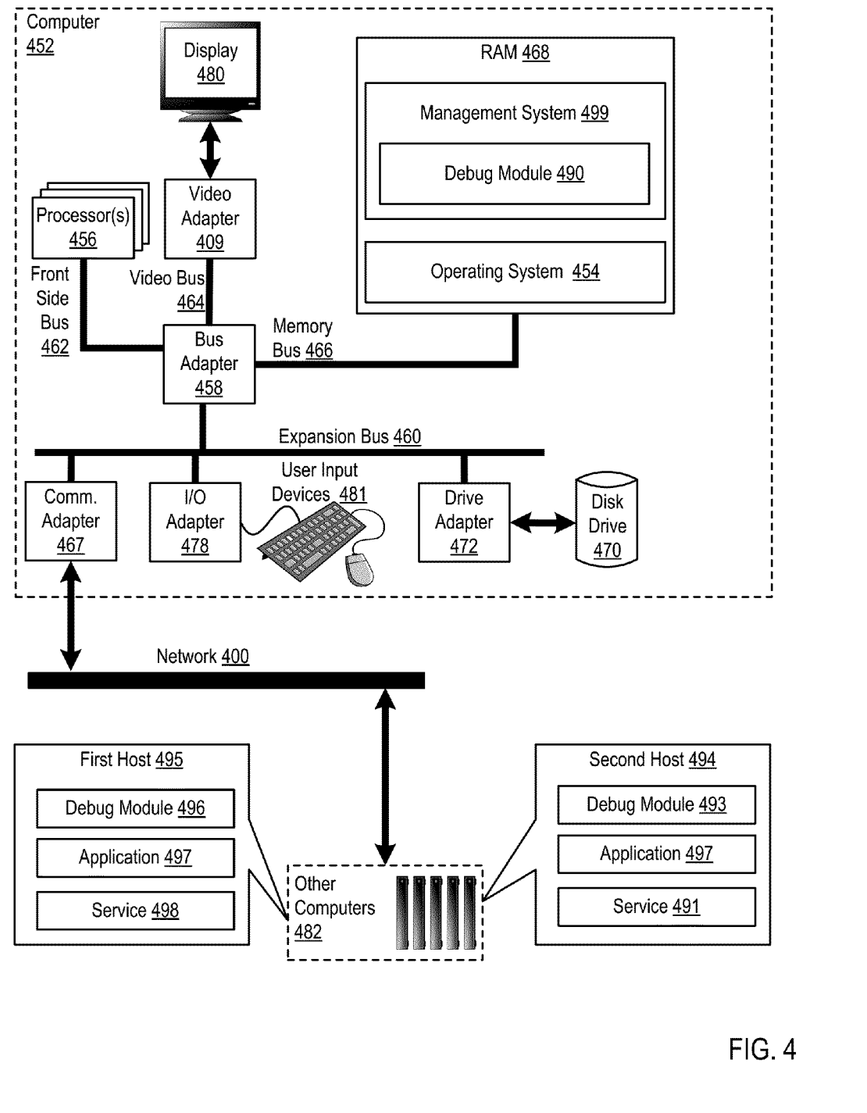
FIG. 4 sets forth a block diagram of automated computing machinery comprising an example computer useful in distributed debugging of an application in a distributed computing environment according to embodiments of the present invention.

For further explanation, FIG. 4 sets forth a block diagram of automated computing machinery comprising an example computer useful in distributed debugging of an application in a distributed computing environment according to embodiments of the present invention. The computer (452) of FIG. 4 includes at least one computer processor (456) or 'CPU' as well as random access memory (468) ('RAM') which is connected through a high speed memory bus (466) and bus adapter (458) to processor (456) and to other components of the computer (452).

The computer (452) is coupled for data communication with other computers (482) via a network (400). The other computers (482) may comprise a distributed computing environment that includes multiple hosts for providing services to users. In the example of FIG. 4, the distributed computing environment includes a first host (495) having a first service (498) and a second host (494) each of which provides resources as services to users of the distributed computing environment. Specifically, the first host (495) includes a first service (498) and the second host (494) includes a second service (491). Each service runs independently from the other service. Both the first host (495) and the second host (494) include an application (497) that independently utilizes both the first service (498) and the second service (491). The first host (495) and the second host (494) also both include a debug module for debugging the application (497).

The debug modules of the hosts may be configured for distributed debugging of the application (497). Specifically, the debug modules may be configured to communicate with a management debug module (490) of the computer (452). For example, the first debug module (496) on the first host (495) may be configured to receive a set breakpoint message from the management debug module. In response to receiving the set breakpoint message, the first debug module may set a breakpoint for executing a first service on the first host, for the application. Upon hitting the breakpoint while executing the first service for the application, the first debug module may send a breakpoint condition of the first service to the management debug module.

Stored in RAM (468) is the management system (499), a module of computer program instructions that, when executed causes the computer (452) of FIG. 4 to perform distributed debugging of the application (497). As explained above, the management system (499) includes the management debug module (490) for communicating with the debug modules of the hosts. The management debug module (490) may be configured to transmit a set breakpoint message and in response to receiving a breakpoint condition, send to the second debug module (493) of the second host (494), an instruction to pause execution of the second service (491) of the second host (494).

Also stored RAM (468) of the computer (452) is an operating system (454). Operating systems useful for distributed debugging of an application in a distributed computing environment according to embodiments of the present invention include UNIX™ Linux™ Microsoft XP™ AIX™ IBM's i5/OS™ and others as will occur to those of skill in the art. The operating systems (454) and the management system (499) in the example of FIG. 4 are shown in RAM (468), but many components of such software typically are stored in non-volatile memory also, such as, for example, on a disk drive (470).

The computer (452) of FIG. 4 includes disk drive adapter (472) coupled through expansion bus (460) and bus adapter (458) to the processors (456) and other components of the computer (452). Disk drive adapter (472) connects non-volatile data storage to the computer (452) in the form of the disk drive (470). Disk drive adapters useful in computers for providing an image for a virtual machine in a distributed computing environment according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (452) of FIG. 4 includes one or more input/output ('I/O') adapters (478). I/O adapters implement user-oriented input/output through, for example, software drivers and computer hardware for controlling output to display devices such as computer display screens, as well as user input from user input devices (481) such as keyboards and mice. The example computer (452) of FIG. 4 includes a video adapter (409), which is an example of an I/O adapter specially designed for graphic output to a display device (480) such as a display screen or computer monitor. The video adapter (409) is connected to the processors (456) through a high speed video bus (464), bus adapter (458), and the front side bus (462), which is also a high speed bus.

The exemplary computer (452) of FIG. 4 includes a communications adapter (467) for data communications with the other computers (482) and for data communications with the data communications network (400). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for distributed debugging of an application in a distributed computing environment according to embodiments of the present invention include modems for wired dial-up communications, Ethernet (IEEE 802.3) adapters for wired data communications, and 802.11 adapters for wireless data communications.

The arrangement of computers and other devices making up the exemplary system illustrated in FIG. 4 are for explanation, not for limitation. Data processing systems useful according to various embodiments of the present invention may include additional databases, servers, routers, other devices, and peer-to-peer architectures, not shown in FIG. 4, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 4.

Figure 5:
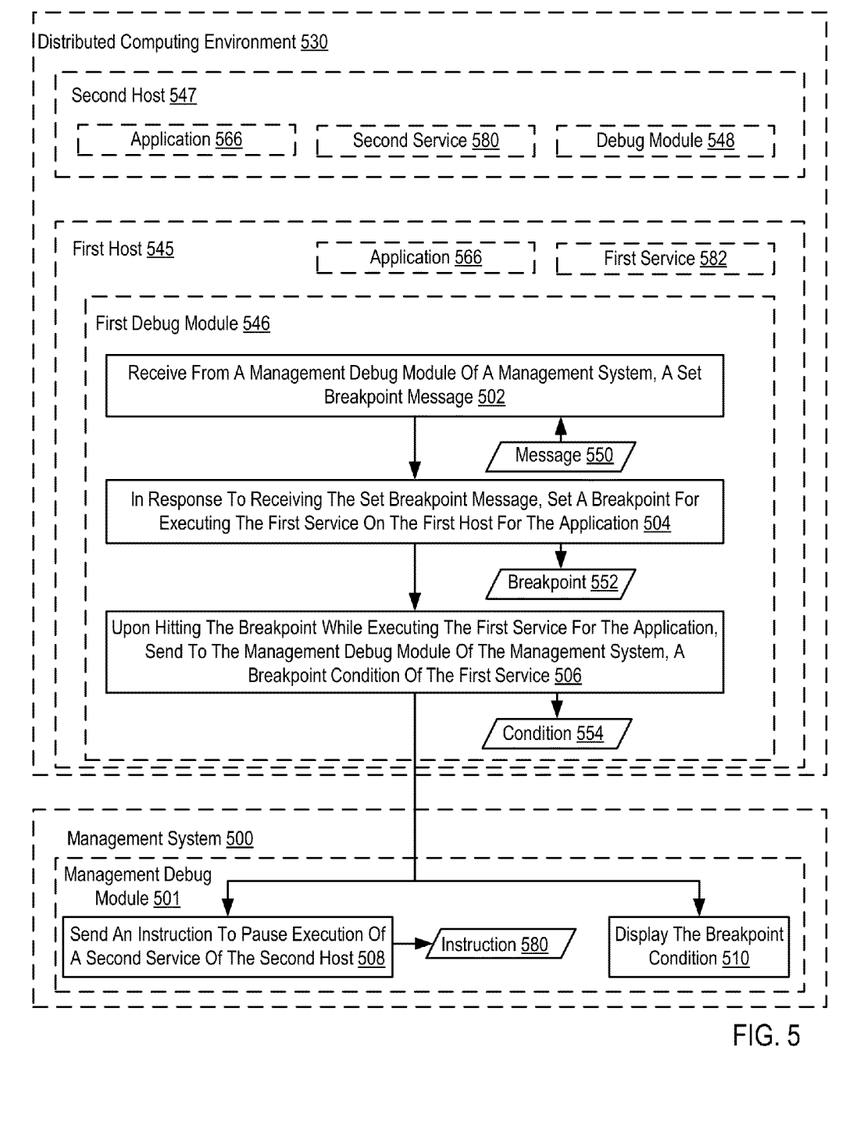
FIG. 5 sets forth a flow chart illustrating an example method for distributed debugging of an application in a distributed computing environment according to embodiments of the present invention.

For further explanation, FIG. 5 sets forth a flow chart illustrating an exemplary method for distributed debugging of an application in a distributed computing environment according to embodiments of the present invention. A distributed computing environment refers to a collection of computers, networks, and automated computing machinery configured to perform distributed processing. A non-limiting example of a distributed computing environment includes a cloud environment having a virtualized computing platform in which a user may be provided access to computing resources without knowledge, ownership, or physical access to the computer resources. The hardware, software, and capabilities of the components of a distributed computing environment or cloud environment may be offered to users as services or objects and may generally be referred to as resources. Non-limiting examples of resources include virtual machines, processing clusters, host operating systems, applications, processing threads, processing allocations, storage allocations, memory allocations, and any many others as will occur to readers of skill in the art.

In the example of FIG. 5, the distributed computing environment (530) includes a first host (545) and a second host (547), each of which provides resources as services to users of the distributed computing environment (530). Specifically, the first host (545) includes a first service (582) and the second host (547) includes a second service (580). Each service runs independently from the other service. Both the first host (545) and the second host (547) include an application (566) that independently utilizes both the first service (582) and the second service (580). The first host (545) and the second host (547) also both include a debug module for debugging the application (566).

The method of FIG. 5 includes a management system (500) for distributed debugging of the application (566) in the distributed computing environment (530). The term 'debug,' and its variations—debugged, debugging, and so on—as used in this specification generally refers to a methodical process of finding and reducing the number of bugs, or defects, in a computer program, that is, in source code of the computer program. Debugging may also be carried out to produce other results—decrease source code size, increase efficiency of the source code, decrease memory used by the executed source code, and so on as will occur to readers of skill in the art. The source code of a software program or application being debugged is referred to in this specification as a 'debuggee.' The management system (500) includes a management debug module (501) that is configured to communicate with a first debug module (546) on the first host (545) and a second debug module (548) on the second host (547) including transmitting and receiving debug commands and initiating and conducting debug sessions. A debug session is a semi-permanent interactive information interchange between two debug modules. As part of setting up a debug session, the debug modules may provide a port, socket, or other data communications identifier with which the other debug modules may use to communicate during a debug session.

A debug module is an application that controls operations of another application for the purpose of testing the other application. A debug module may be configured to halt execution of code when specific conditions are encountered. When execution of a program crashes or reaches a preset condition, a debug module may display the position in the source code at which the execution of the program crashed. A 'crash' occurs when the program cannot normally continue because of a programming bug. In addition to displaying a position in source code when execution of the source code crashes, debug modules also often offer other functions such as running a program step by step (single-stepping or program animation), stopping, breaking, or pausing the program to examine the current state, at some event or specified instruction by means of a breakpoint, and tracking the values of some variables.

In the example of FIG. 5, the management debug module (501) is configured to control the debug operation of the application through the first debug module (546) and the second debug module (548). For example, the management debug module (501) may be configured to receive user input via a graphical user interface (GUI) for controlling debug operations of the application. Examples of types of user input include but are not limited to detecting mouse-overs, detecting keyboard keystrokes, detecting keyboard shortcuts, detecting explicit commands entered into a field presented to receive such commands, detecting selection of drop-down menu items, detecting mouse-clicks on GUI items, such as GUI buttons, and so on. User input may specify debug parameters, such as breakpoints for the application.

Based on the user input, the management debug module (501) may identify an event for the first service (582) of the first host (545) and transmit a request for the event within a message to the first host (545). An event is a predefined occurrence during execution of debuggee. Such an event may include encountering a breakpoint, a watchpoint, a catchpoint, or the like. A breakpoint is a specification of a source code location at which a debuggee will pause or stop execution. A watchpoint is a breakpoint configured to pause or stop execution of the debuggee when a value of a particular expression changes. A catchpoint is another type of breakpoint configured to pause or stop execution of the debuggee when a specified event occurs such as the throwing of an exception or a load of a library, and so on.

The method of FIG. 5 includes the first debug module (546) receiving (502) the set breakpoint message (550) from the management debug module (501). Receiving (502) a set breakpoint message (550) may be carried out by listening on a well-known data communications socket, upon which messages of the kind sent by the management debug module is expected to be received.

In addition, the management debug module may also be configured to transmit other commands to a debug module through a command line interface including but not limited to: backtrace, step, next, until, continue, clear, help, info breakpoints, info watchpoints, info registers, info threads, and so on as will occur to readers of skill in the art. These are merely some of the many possible commands which may be issued to a debug module.

The method of FIG. 5 also includes the first debug module (546) of the first host (545) setting (504) in response to receiving the set breakpoint message (550), a breakpoint (552) for executing the first service (582) on the first host (545) for the application (566). Setting (504) in response to receiving the set breakpoint message (550), a breakpoint (552) for executing the first service (582) on the first host (545) for the application (566) may be carried out by enabling a breakpoint, watchpoint, or catchpoint at a particular location in source code specified by the management debug module in the set breakpoint message.

The method of FIG. 5 also includes the first debug module (546) of the first host (545) sending (506) upon hitting the breakpoint (552) while executing the first service (582) for the application (566), to the management debug module (501) of the management system (500), a breakpoint condition (554) of the first service (582). A breakpoint condition indicates a condition of a value of a variable of the application at the point that execution of the application was stopped, paused, halted, or crashed. Sending (506) upon hitting the breakpoint (552) while executing the first service (582) for the application (566), to the management debug module (501) of the management system (500), a breakpoint condition (554) of the first service (582) may be carried out by transmitting a reply message containing the breakpoint condition to the management debug module via a data communication channel.

The method of FIG. 5 also includes the management debug module (501) sending to the second debug module (548) of the second host (547), in response to receiving the breakpoint condition (554), an instruction (580) to pause execution of the second service (580) of the second host (547). Sending to the second debug module (548) of the second host (547), in response to receiving the breakpoint condition (554), an instruction (580) to pause execution of the second service (580) of the second host (547) may be carried out by transmitting a pause command to one or more other hosts that have services utilized by the application.

Figure 6:
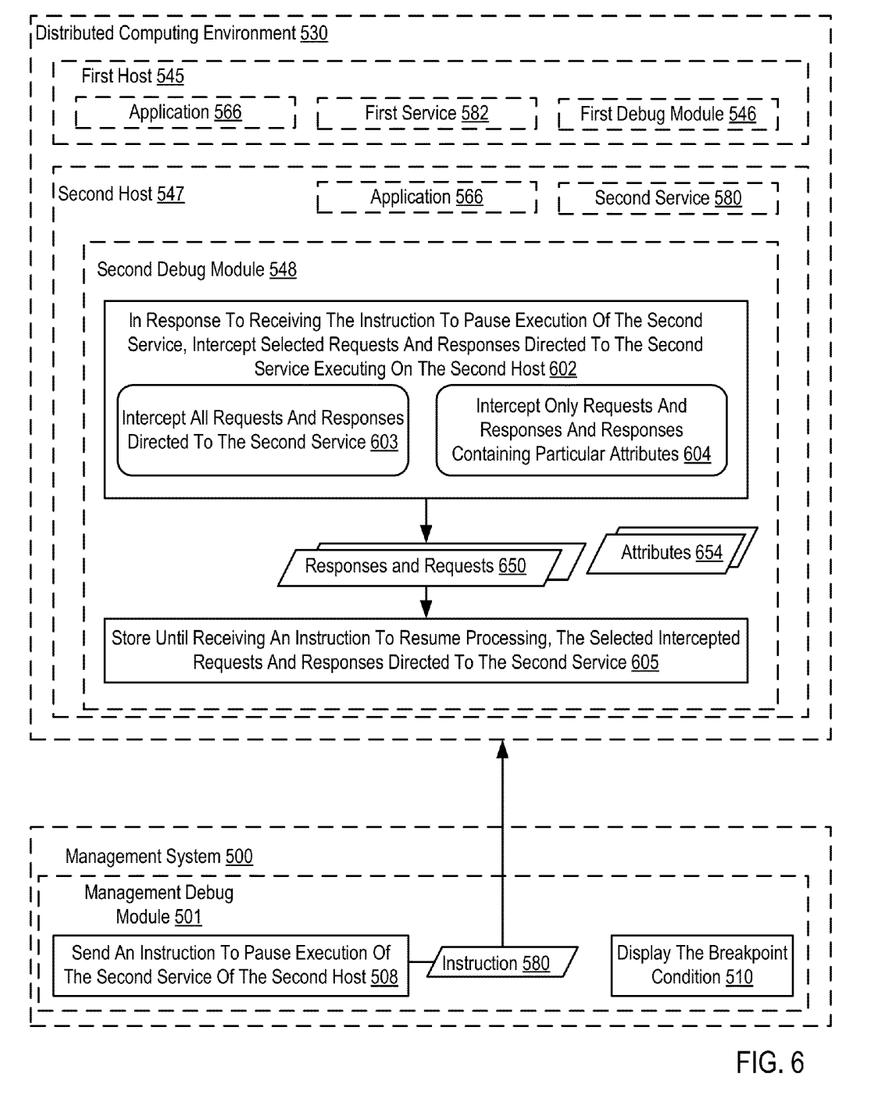
FIG. 6 sets forth a flow chart illustrating an additional example method for distributed debugging of an application in a distributed computing environment according to embodiments of the present invention.

The method of FIG. 6 includes the management debug module (501) displaying (602) the breakpoint condition (554) in response to receiving the breakpoint condition (554). Displaying (602) the breakpoint condition (554) in response to receiving the breakpoint condition (554) may be carried out by presenting to a user of the management system, a GUI that shows one or more values of a variable of a distributed service. The breakpoint condition may be identified in a variety of ways including by variable name, line number, or session identifier.

The management debug module may also receive additional information from the debug modules including any data that specifies the state of the application. For example, the debug modules may store and transmit an environment that includes information specifying a relationship between variables of the application. An environment may specify a number of parameters of a debug session including breakpoints, watchpoints, monitored variables, output styles (hexadecimal or otherwise) and the like. That is, according to embodiments of the present invention, debugging of distributed services may be coordinated and controlled by the management system.

For further explanation, FIG. 6 sets forth a flow chart illustrating another example method for distributed debugging of an application in a distributed computing environment according to embodiments of the present invention. The method of FIG. 6 is similar to the method of FIG. 5 in that the method of FIG. 6 also includes the management system (500) sending to the second debug module (548) of the second host (547), in response to receiving the breakpoint condition (554), an instruction (580) to pause execution of the second service (580) of the second host (547); and displaying (602) the breakpoint condition (554) in response to receiving the breakpoint condition (554).

The method of FIG. 6 also includes the second debug module (548) of the second host (547), intercepting (602), in response to receiving the instruction (580) to pause execution of the second service (580), selected requests and responses (650) directed to the second service (580) executing on the second host (547). A request is a message that includes a command associated with the execution of the service. A response is a message that is generated by the service in response to the request. That is, the requests and responses are the input and output of the service. Intercepting (602), in response to receiving the instruction (580) to pause execution of the second service (580), selected requests and responses (650) directed to the second service (580) executing on the second host (547) may be carried out by stopping the service from receiving input and providing output.

In the example of FIG. 6, intercepting (602) selected requests and responses (650) directed to the second service (580) executing on the second host (547) may include intercepting (603) all requests and responses directed to the second service (580). Alternatively, intercepting (602) selected requests and responses (650) directed to the second service (580) executing on the second host (547) may include intercepting (604) any requests containing particular attributes (654) and any responses containing the particular attributes (654). Examples of attributes include at least one of an overall transaction identification; a request for a specific service; a request for a specific instance; a specific user; and a specific tenant (e.g., a set of allocated distributed resources). Intercepting (604) any requests containing particular attributes (654) and any responses containing the particular attributes (654) may be carried out by examining each response and request for the particular attributes. That is, with this type of interception, only identified input and output of the service is stopped.

The second debug module (548) of the second host (547) storing (605) until receiving an instruction to resume processing, the selected intercepted requests and responses (650) directed to the second service (580). Storing (605) until receiving an instruction to resume processing, the selected intercepted requests and responses (650) directed to the second service (580) may be carried out by listening on a well-known data communications socket, upon which messages of the kind sent by the management debug module is expected to be received; receiving a resume message from the management debug module; and providing the stored responses and requests to the debug module.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of 5 network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of distributed debugging of an application in a distributed computing environment, the application using multiple independent services, each of which is deployed on a separate host of the distributed computing environment, each host including a computer processor and a computer memory, the method comprising:
   receiving from a management debug module of a management system, by a first debug module executing on a computer processor of a first host of the distributed computing environment, a set breakpoint message;
   in response to receiving the set breakpoint message, setting, by the first debug module executing on the computer processor of the first host of the distributed computing environment, a breakpoint for executing a first service on the first host, for the application;
   upon hitting the breakpoint while executing the first service for the application, sending to the management debug module, by the first debug module executing on the computer processor of the first host of the distributed computing environment, a breakpoint condition of the first service; and
   in response to receiving the breakpoint condition, sending to a second debug module executing on a computer processor of a second host, by the management debug module, an instruction to pause execution of the second service of the second host;
   in response to receiving the instruction to pause execution of the second service, intercepting, by the second debug module executing on the computer processor of the second host, selected requests and responses directed to the second service executing on the second host; and
   storing until receiving an instruction to resume processing, by the second debug module executing on the computer processor of the second host, the selected intercepted requests and responses directed to the second service.

2. The method of claim 1 further comprising in response to receiving the breakpoint condition, displaying, by the management debug module of the management system, the breakpoint condition.

3. The method of claim 1 wherein intercepting selected requests and responses directed to the second service executing on the second host includes intercepting all requests and responses directed to the second service.

4. The method of claim 1 wherein intercepting selected requests and responses directed to the second service executing on the second host includes intercepting any requests containing particular attributes and any responses containing the particular attributes.

5. The method of claim 4 wherein the particular attributes include at least one of an overall transaction identification; a request for a specific service; a request for a specific instance; a specific user; and a specific tenant.

* * * * *